(12) United States Patent
Lee et al.

(10) Patent No.: US 8,406,550 B2
(45) Date of Patent: *Mar. 26, 2013

(54) ELECTRONIC DEVICE AND METHOD FOR FILTERING NOISE IN AN IMAGE

(75) Inventors: Chung-I Lee, New Taipei (TW);
Chien-Fa Yeh, New Taipei (TW);
Chiu-Hua Lu, New Taipei (TW);
Cheng-Feng Tsai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/477,075

(22) Filed: May 22, 2012

(65) Prior Publication Data

US 2012/0230585 A1   Sep. 13, 2012

Related U.S. Application Data

(63) Continuation of application No. 12/582,826, filed on Oct. 21, 2009, now Pat. No. 8,238,656.

(30) Foreign Application Priority Data

Jun. 5, 2009   (CN) .......................... 2009 1 0302952

(51) Int. Cl.
*G06K 9/40* (2006.01)
*G06K 9/00* (2006.01)
(52) U.S. Cl. ....................................... 382/260; 382/167
(58) Field of Classification Search .................. 382/143, 382/167, 260, 261, 262, 263, 264, 275
See application file for complete search history.

(56) References Cited

U.S. PATENT DOCUMENTS

| | | | |
|---|---|---|---|
| 7,561,752 B2 * | 7/2009 | Monobe et al. ............... | 382/268 |
| 7,586,658 B2 * | 9/2009 | Heo .............................. | 358/520 |
| 8,073,286 B2 * | 12/2011 | David et al. .................. | 382/275 |
| 2010/0119163 A1 * | 5/2010 | Inoue ............................ | 382/224 |

* cited by examiner

*Primary Examiner* — Yon Couso
(74) *Attorney, Agent, or Firm* — Altis Law Group, Inc.

(57) ABSTRACT

A method for filtering noise in an image filters noise pixels in a discrepant block between a current image and a background image firstly, and further filter each small block whose area is less than a preset value from the discrepant block. The method further calculates a total area of each big block whose area is greater than or equal to the preset value from the discrepant block, and adds the current image to a background list of the current image if the total area is less than another preset value.

21 Claims, 5 Drawing Sheets

ELECTRONIC DEVICE AND METHOD FOR FILTERING NOISE IN AN IMAGE

CROSS-REFERENCE TO RELATED APPLICATION

This application is a continuation application of U.S. application Ser. No. 12/582,826, filed on Oct. 21, 2009.

BACKGROUND

1. Technical Field

Embodiments of the present disclosure relate to image processing technology, and particularly to an electronic device and method for filtering noise in an image.

2. Description of Related Art

Noise may be filtered from an image using a number of known methods. One such method filters pixels in the image whose difference value of red, green, and blue (RGB) is less than a preset value. Another method sharpens the image firstly, then, filters the pixels in the sharpened image whose difference value of RGB is less than the preset value. However, the above-mentioned two methods cannot filter the noise in the image efficiently. Therefore, prompt and accurate method of filtering noise in an image is desired.

DETAILED DESCRIPTION

All of the processes described below may be embodied in, and fully automated via, functional code modules executed by one or more general purpose computers or processors. The code modules may be stored in any type of readable medium or other storage device. Some or all of the methods may alternatively be embodied in specialized hardware. Depending on the embodiment, the readable medium may be a hard disk drive, a compact disc, a digital video disc, or a tape drive.

Figure 1:
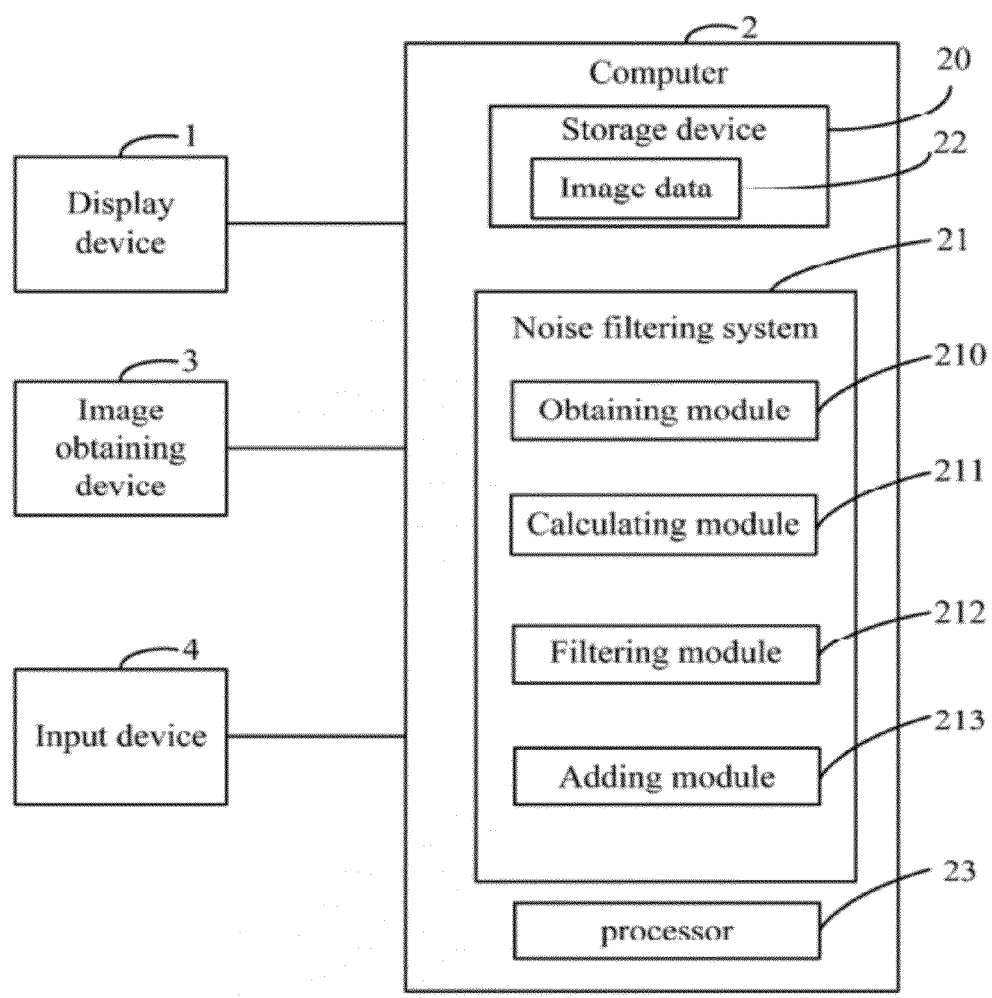
FIG. 1 is a block diagram of one embodiment of a computer comprising a system for filtering noise in an image.

FIG. 1 is a block diagram of one embodiment of a computer 2 comprising a noise filtering system 21. In one embodiment, the noise filtering system 21 may be used to filter noise from an image by first filtering noise pixels in a discrepant block (refers to FIG. 3) between a current image and a background image, and then filter each small block whose area is less than a preset value from the discrepant block. A total area of each big block whose area is greater than or equal to the preset value is obtained from the discrepant block, and the current image is added to a background list of the current image if the total area is less than another preset value. In one embodiment, the background list is a data structure (e.g., a queue) for storing the background image, and the discrepant block is an array of one or more pixels connected together. A detailed description will be given in the following paragraphs.

In one embodiment, the computer 2 (or any other suitable electronic device) is electronically connected to a display device 1, an image obtaining device 3, and an input device 4. Depending on the embodiment, the display device 1 may be a liquid crystal display (LCD) or a cathode ray tube (CRT) display, for example.

The computer 2 further includes a storage device 20 for storing information, such as image data 22 captured by the image obtaining device 3. In one embodiment, the image obtaining device 3 may be an Internet Protocol (IP) Camera.

The input device 4 may be used to manually edit a displayed image of an image data 22 on the display device 1. In one embodiment, the input device 4 may be a keyboard.

In one embodiment, the noise filtering system 21 includes an obtaining module 210, a calculating module 211, a filtering module 212, and an adding module 213. In one embodiment, the modules 210-213 comprise one or more computerized instructions that are stored in the storage device 20. A processor 23 of the computer 2 executes the computerized instructions to implement one or more operations of the computer 2.

The obtaining module 210 obtains a current image and a background image from the storage device 20. In one embodiment, the current image and the background image are automatically acquired by the image obtaining device 3 (e.g., the IP Camera).

Figure 3A:
FIGS. 3A-3C are schematic diagrams of one embodiment of calculating a discrepant block between a current image and a background image.
Figure 3B:
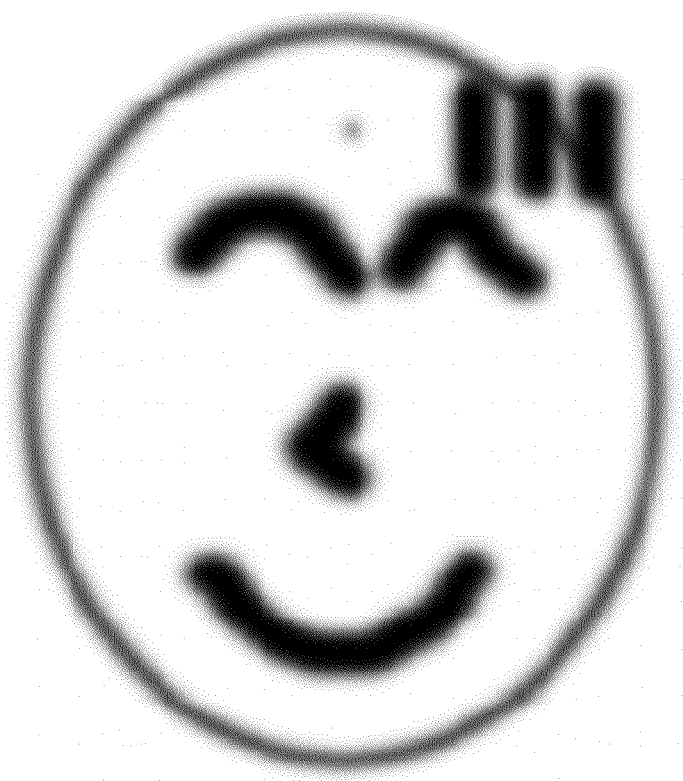
Figure 3C:
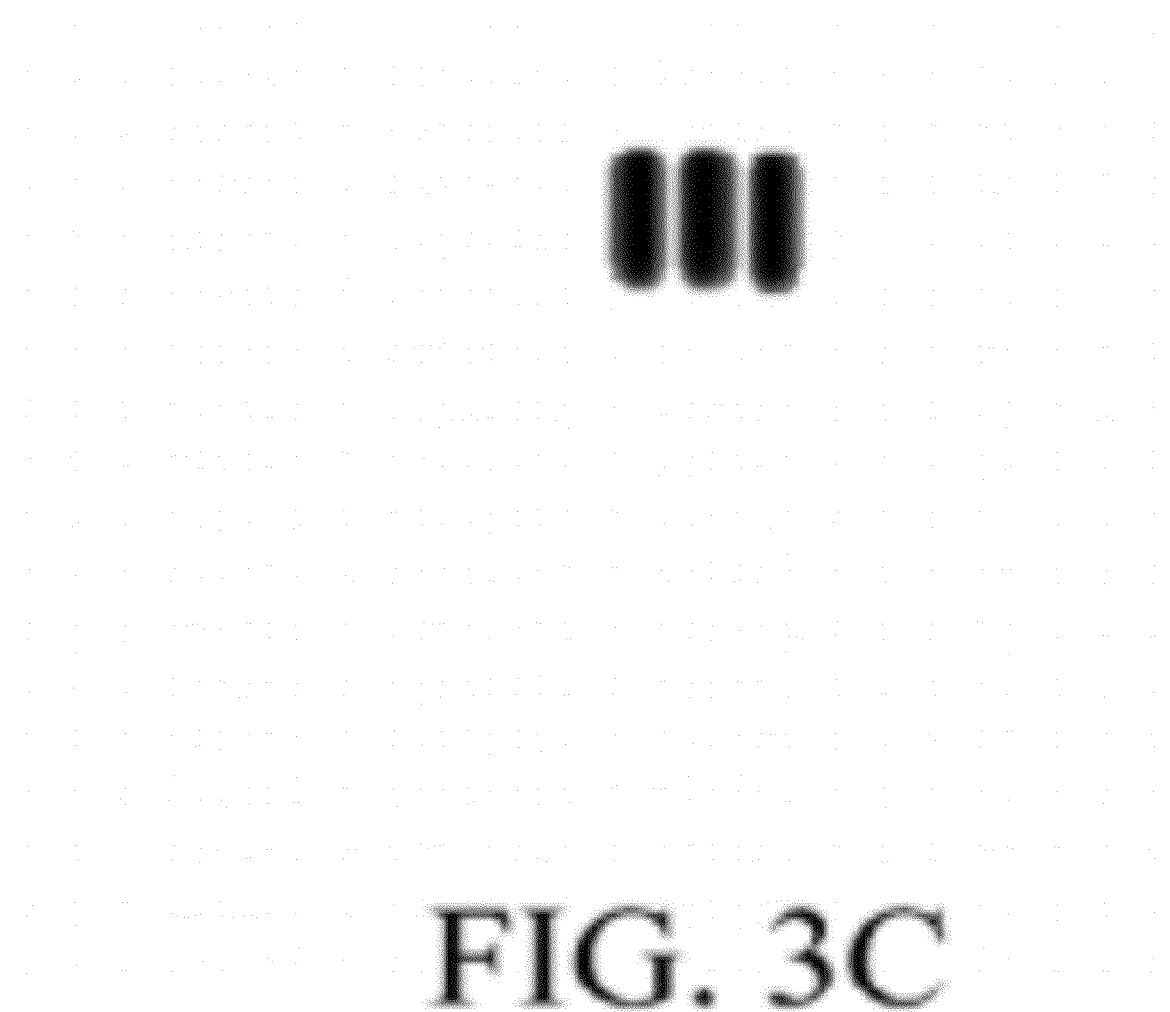

The calculating module 211 determines if a background list of the current image is null, and calculates a discrepant block between the current image and the background image if the background list is not null. As an image comprises a plurality of blocks, the block in the current image may be different from the block in the background image, and the different block between the current image and the background image is regarded as a discrepant block. An example of the discrepant block between the current image and the background image is shown in FIGS. 3A-3C. Referring to FIGS. 3A-3C, FIG. 3A represents a current image, FIG. 3B represents a background image, and FIG. 3C represents a discrepant block between FIG. 3A and FIG. 3B.

The filtering module 212 filters each pixel of the discrepant block whose difference value of red, green, and blue (RGB) is less than a first preset value from the discrepant block. In one embodiment, the difference value of RGB of each pixel in the discrepant block refers to a difference value between an RGB value of the pixel and an RGB value of a corresponding pixel in the background image. Supposing the first preset value is twenty four, the filtering module 212 filters each pixel whose difference value of RGB is less than twenty four from the discrepant block. In other embodiment, the filtering module 212 can filter each pixel whose difference value of YCbCr or other suitable difference value is less than a corresponding preset value from the discrepant block. In YCbCr, Y is the brightness (luma), Cb is blue minus luma (B−Y), and Cr is red minus luma (R−Y).

The filtering module 212 filters each small block of the discrepant block whose area is less than a second preset value from the discrepant block. In one embodiment, the second preset value is 40 pixels.

The calculating module 211 calculates a total area of each big block of the discrepant block whose area is greater than or equal to the second preset value from the discrepant block, and determines if the total area is less than a third preset value. In one embodiment, the third preset value is 200 pixels.

The adding module 213 adds the current image to the background list if the background list is null, or adds the current image being filtered to the background list if the total area is less than the third preset value.

The obtaining module 210 further obtains a next current image and a next background image from the storage device 20 if the total area is greater than or equal to the third preset value. Thus, the next current image can be filtered by modules 211-213.

In other embodiment, the obtaining module 210 may first sharpen the current image after the current image is obtained from the storage device 20.

Figure 2:
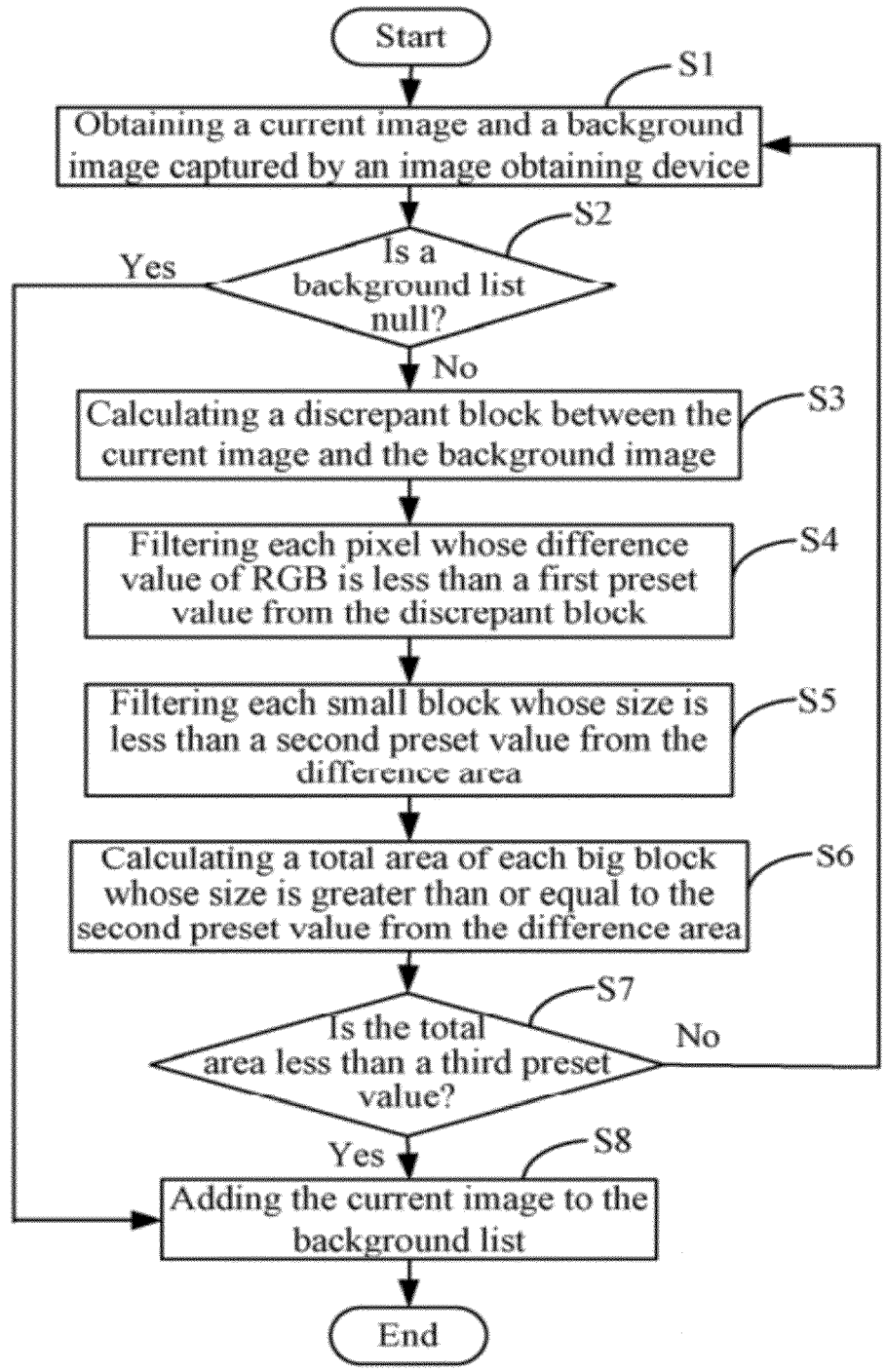
FIG. 2 is a flowchart of one embodiment of a method for filtering noise in an image.

FIG. 2 is a flowchart of one embodiment of a method for filtering noise in an image. Depending on the embodiment, additional blocks may be added, others removed, and the ordering of the blocks may be changed.

In block S1, the obtaining module 210 obtains a current image and a background image from the storage device 20.

In block S2, the calculating module 211 determines if a background list of the current image is null. The procedure goes to block S8 directly if the background list is null, or the procedure goes to block S3 if the background list is not null.

In block S3, the calculating module 211 calculates a discrepant block between the current image and the background image.

In block S4, the filtering module 212 filters each pixel of the discrepant block whose difference value of red, green, and blue (RGB) is less than a first preset value from the discrepant block. In one embodiment, the difference value of RGB of each pixel in the discrepant block refers to a difference value between an RGB value of the pixel and an RGB value of a corresponding pixel in the background image.

In block S5, the filtering module 212 filters each small block of the discrepant block whose area is less than a second preset value from the discrepant block. In one embodiment, the second preset value is 40 pixels.

In block S6, the calculating module 211 calculates a total area of each big block of the discrepant block whose area is greater than or equal to the second preset value from the discrepant block.

In block S7, the calculating module 211 determines if the total area is less than a third preset value, and the procedure goes to block S8 if the total area is less than the third preset value, or the procedure returns to block S1 if the total area is greater than or equal to the third preset value.

In block S8, the adding module 213 adds the current image to the background list if the background list is null, or adds the current image being filtered to the background list if the total area is less than the third preset value.

In other embodiment, the method further includes a following block before S1: the obtaining module 210 sharpens the current image after the current image is obtained from the storage device 20.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for filtering noise in an image using an electronic device comprising a processor, the method comprising execution of the steps comprising:

obtaining a current image and a background image from a storage device using the processor;

adding the current image to a background list of the current image upon the condition that the background list is null using the processor;

calculating a discrepant block between the current image and the background image upon the condition that the background list of the current image is not null using the processor;

filtering each specified pixel of the discrepant block using the processor, a difference value between each specified pixel in the discrepant block and a corresponding pixel in the background image being less than a first preset value;

filtering each small block of the discrepant block using the processor, an area of each small block being less than a second preset value;

calculating a total area of each big block of the discrepant block using the processor, an area of each big block being greater than or equal to the second preset value; and adding the current image being filtered to the background list upon the condition that the total area is less than a third preset value using the processor.

2. The method according to claim 1, wherein the background list is a data structure for storing the background image.

3. The method according to claim 1, further comprising: obtaining a next current image and a next background image from the storage device upon the condition that the total area is greater than or equal to the third preset value.

4. The method according to claim 1, further comprising: sharpening the current image after the current image is obtained from the storage device.

5. The method according to claim 1, wherein the discrepant block refers to an array of one or more pixels connected together.

6. The method according to claim 1, wherein the difference value of each specified pixel in the discrepant block refers to a difference value of red, green, and blue (RGB) between an RGB value of the specified pixel and an RGB value of a corresponding pixel in the background image.

7. The method according to claim 1, wherein the difference value of each specified pixel in the discrepant block refers to a difference value of YCbCr between a YCbCr value of the specified pixel and a YCbCr value of a corresponding pixel in the background image, wherein Y is the brightness (luma), Cb is blue minus luma (B−Y), and Cr is red minus luma (R−Y).

8. A non-transitory storage medium having stored thereon instructions that, when executed by a processor of an electronic device, cause the electronic device to perform a method for filtering noise in an image, the method comprising:

obtaining a current image and a background image from a storage device;

adding the current image to a background list of the current image upon the condition that the background list is null;

calculating a discrepant block between the current image and the background image upon the condition that the background list of the current image is not null;

filtering each specified pixel of the discrepant block, a difference value between each specified pixel in the discrepant block and a corresponding pixel in the background image being less than a first preset value;

filtering each small block of the discrepant block, an area of each small block being less than a second preset value;

calculating a total area of each big block of the discrepant block, an area of each big block being greater than or equal to the second preset value; and adding the current image being filtered to the background list upon the condition that the total area is less than a third preset value.

9. The non-transitory storage medium according to claim 8, wherein the background list is a data structure for storing the background image.

10. The non-transitory storage medium according to claim 8, wherein the method further comprises: obtaining a next current image and a next background image from the storage device upon the condition that the total area is greater than or equal to the third preset value.

11. The non-transitory storage medium according to claim 8, wherein the method further comprises: sharpening the current image after the current image is obtained from the storage device.

12. The non-transitory storage medium according to claim 8, wherein the discrepant block refers to an array of one or more pixels connected together.

13. The non-transitory storage medium according to claim 8, wherein the difference value of each specified pixel in the discrepant block refers to a difference value of red, green, and blue (RGB) between an RGB value of the specified pixel and an RGB value of a corresponding pixel in the background image.

14. The non-transitory storage medium according to claim 8, wherein the difference value of each specified pixel in the discrepant block refers to a difference value of YCbCr between a YCbCr value of the specified pixel and a YCbCr value of a corresponding pixel in the background image, wherein Y is the brightness (luma), Cb is blue minus luma (B−Y), and Cr is red minus luma (R−Y).

15. An electronic device, comprising:
a storage device;
at least one processor; and
one or more modules that are stored in the storage device and executed by the at least one processor, the one or more modules comprising:
an obtaining module that obtains a current image and a background image from the storage device;
an adding module that adds the current image to a background list of the current image upon the condition that the background list is null;
a calculating module that calculates a discrepant block between the current image and the background image upon the condition that the background list of the current image is not null;
a filtering module that filters each pixel of the discrepant block, a difference value between each specified pixel in the discrepant block and a corresponding pixel in the background image being less than a first preset value;
the filtering module that further filters each small block of the discrepant block, an area of each small block being less than a second preset value;
the calculating module that further calculates a total area of each big block of the discrepant block, an area of each big block being greater than or equal to the second preset value; and
the adding module that adds the current image being filtered to the background list upon the condition that the total area is less than a third preset value.

16. The electronic device according to claim 15, wherein the background list is a data structure for storing the background image.

17. The electronic device according to claim 15, wherein the obtaining module further obtains a next current image and a next background image from the storage device upon the condition that the total area is greater than or equal to the third preset value.

18. The electronic device according to claim 15, wherein the obtaining module further sharpens the current image after the current image is obtained from the storage device.

19. The electronic device according to claim 15, wherein the discrepant block refers to an array of one or more pixels connected together.

20. The electronic device according to claim 15, wherein the difference value of each specified pixel in the discrepant block refers to a difference value of red, green, and blue (RGB) between an RGB value of the specified pixel and an RGB value of a corresponding pixel in the background image.

21. The electronic device according to claim 15, wherein the difference value of each specified pixel in the discrepant block refers to a difference value of YCbCr between a YCbCr value of the specified pixel and a YCbCr value of a corresponding pixel in the background image, wherein Y is the brightness (luma), Cb is blue minus luma (B−Y), and Cr is red minus luma (R−Y).

* * * * *